Figure 1:
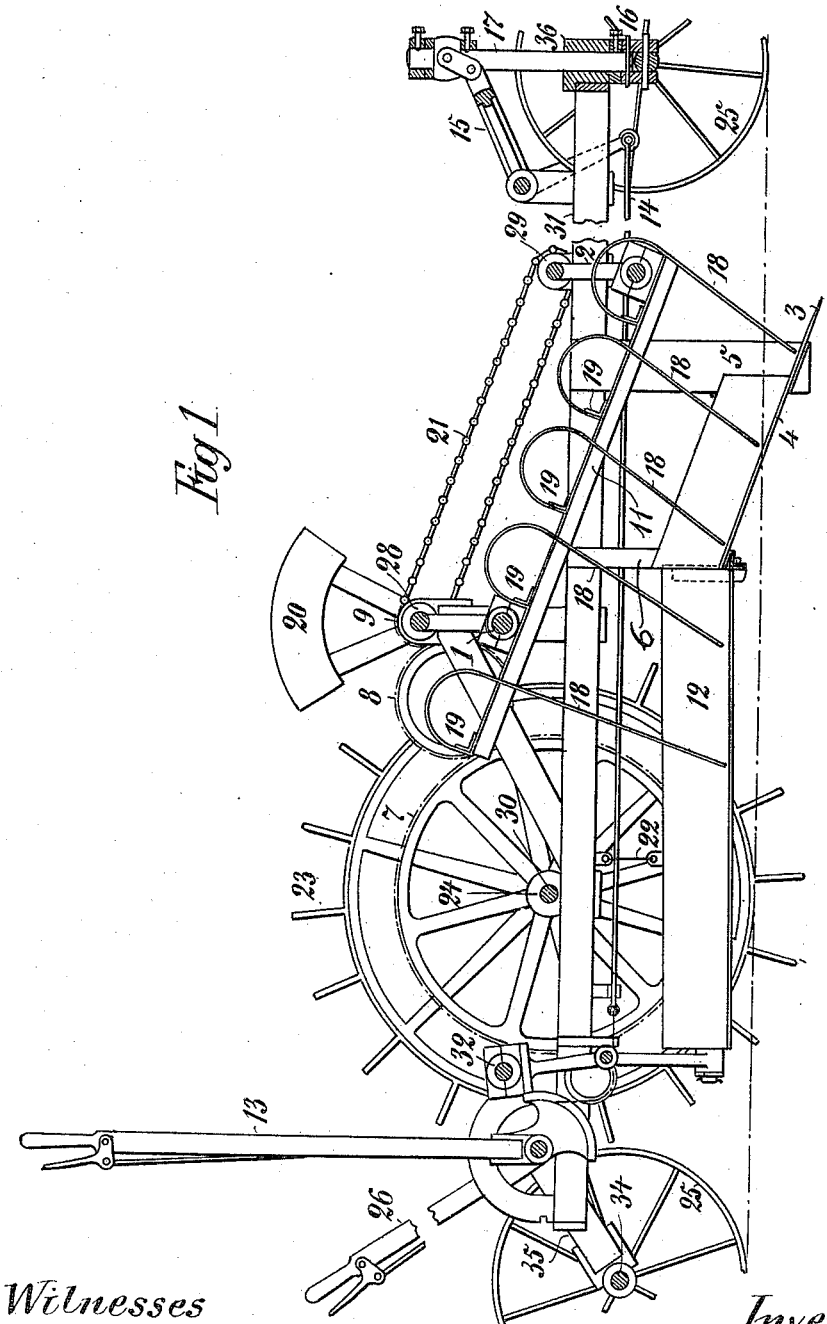

J. O. THORSEN.
POTATO HARVEST MACHINE.
APPLICATION FILED MAY 26, 1910.

973,318.

Patented Oct. 18, 1910.

3 SHEETS—SHEET 1.

Witnesses

Inventor

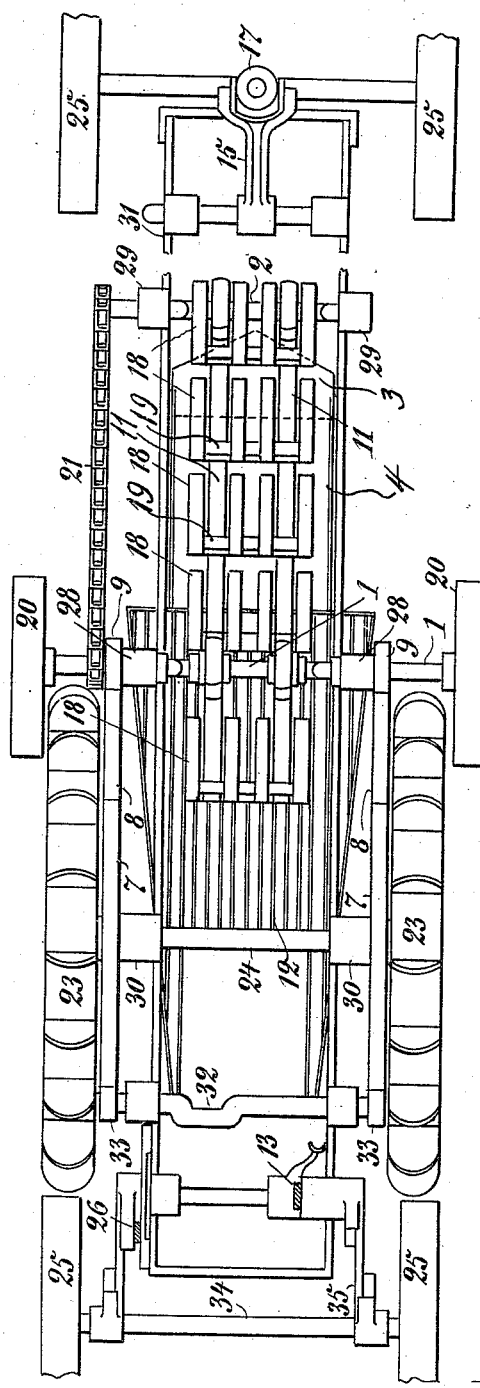

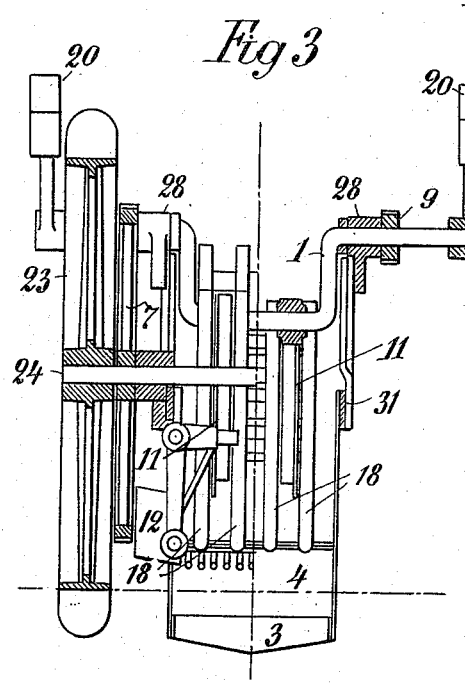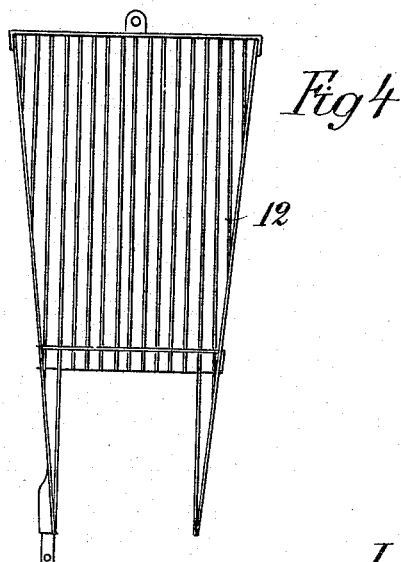

UNITED STATES PATENT OFFICE.

JENS OLAF THORSEN, OF AALBORG, DENMARK.

POTATO-HARVEST MACHINE.

973,318.  Specification of Letters Patent.  Patented Oct. 18, 1910.

Application filed May 26, 1910. Serial No. 563,655.

*To all whom it may concern:*

Be it known that I, JENS OLAF THORSEN, farmer, subject of the Kingdom of Denmark, residing at Aalborg, Denmark, have invented new and useful Improvements in Potato-Harvest Machines, of which the following is a specification.

The invention has for its object a potato harvest machine of the so called sieve- or screen-system, in which the earth and potatoes loosened by a plow are conveyed to a sieve or other shaking device, which separates the earth from the potatoes and lays aside the latter.

The invention is characterized by a device operated from the wheel shaft and having an alternately downward and rearward and upward and forward movement, which device is mounted above the plow and the screen mounted directly behind the plow, in such a manner that during its downward and rearward motion the device takes the earth and potatoes, loosened by the plow, from above and conveys said earth and potatoes over the plow to the screen, whereupon it leaves again the earth and goes ahead for new work.

Further the invention is characterized by means whereby the front-wheels can be adjusted by a lever arranged at the rear end of the machine in such a manner that by the operation of said lever the plow can be lifted or lowered.

A constructional form of the invention is shown in the drawings, in which—

Figure 1 shows a side view of a potato harvest machine in accordance with the invention; the front side of the frame and some other parts are cut away; Fig. 2 is a plan view of the machine; Fig. 3 a transverse section of the machine, and Fig. 4 a plan view of the screen.

The different parts of the machine are mounted in a frame 31 provided with bearings 30 for the shaft 24 of the driving wheels 23 and being supported by means of front wheels and rear wheels 25, the shafts of which can be lifted or lowered in such a manner, that by lifting said shafts the frame 31 can be lifted so much, that the driving wheels are free from the soil when the machine is not working.

The frame 31 has bearings 28 and 29 for two crank shafts 1 and 2 connected together by means of a chain 21 and chain wheels. The shaft 1 is rotated from the driving wheels by means of pinions 7, 8 and 9, the pinions 7 being fixed to the driving wheels. The crank shafts carry a frame which consists of two side pieces 11 and transverse pieces 19 which latter carry curved downwardly projecting teeth 18 which have such a length and inclination, that during the lower half of the rotation of the cranks they scrape the plow and the screen arranged below. Counterweights 20 are fixed to the ends of the crank shaft 1, balancing the cranks and thereby giving the shafts an equal motion.

The plow which consists of a share 3 and a moldboard 4 is fixed to the frame 31 by means of tiebands 5 and 6. The screen 12 is suspended in links 22 and has its rear end connected to a crank shaft 32 by means of a link. The crank shaft 32 is rotated from the pinions 7 by means of pinions 33 fixed to the ends of the crank shaft, so that the screen is operated when the machine is working.

The shaft 34 of the rear wheels 25 is mounted in a frame 35, which can be lifted or lowered by means of a lever 26, so that by turning said lever the driving wheels 23 can be lifted free from the soil when the machine is not working.

The shaft of the front wheels 25 is fixed to a vertical shaft 17 which may slide in a guide 36 at the front end of the frame 31 and which is pivotally connected to a bent lever 15, mounted in bearings in the frame 31 and connected by means of a rod- and chain-connection to a lever 13, arranged in the rear end of the machine, in such a manner that by turning said lever the front end of the machine can be lifted or lowered and thereby the plow can be lifted free of the earth or adjusted to work in the desired depth, in which latter position it is fixed by means of a ring 16 inserted upon the vertical shaft 17 and held in the desired position by means of a screw.

The operation of the machine is as follows: When the crank shafts 1 and 2 are rotated the teeth-carrying frame is alternately moved downward and rearward and upward and forward. Under the downward and rearward movement the teeth take from above the earth and potatoes loosened by the plow and convey said earth and potatoes over the plow to the screen, which separates the earth from the potatoes and lays aside the latter. During the upward and forward motion the teeth leave again the earth and go ahead for new work.

The teeth are of a yielding material, which allows them to yield against stones or the like which may be contained in the earth.

The construction shown and described of course may be varied in different manners without departing from the invention.

Claims.

1. In a potato digger, the combination with a frame, of supporting wheels carried at each terminal thereof, a main driving shaft located on said frame adjacent to one terminal thereof, driving wheels rigidly mounted on said shaft adapted to engage the ground and rotate said shaft when said device is in use, a pair of crank shafts located adjacent to said wheel, a frame adapted to be moved alternately rearwardly and downwardly and forwardly and upwardly, a series of downwardly extending fingers carried by said frame, means whereby said shafts may be rotated from said driving wheel, a screen located adjacent to said fingers, and means whereby the potatoes may be removed from the ground.

2. In a potato digger, the combination with a frame, of an oscillating screen carried thereby, means for removing the potatoes from the ground carried adjacent to said screen, a main driving shaft carried by said frame, a driving wheel carried at each extremity of said shaft adapted to bite into the ground and rotate said shaft, a pair of crank shafts disposed above said plow, means whereby said crank shafts may be rotated by said driving shaft, a frame carried by said crank shafts adapted to alternately move downwardly and rearwardly and forwardly and upwardly thereby conveying potatoes from the plow to the screen, and a series of downwardly extending fingers carried by said frame.

3. In a potato digger, the combination with a frame, of an oscillating screen carried thereby, means for removing the potatoes from the ground carried adjacent to said screen, a main driving shaft carried by said frame, a driving wheel carried at each extremity of said shaft adapted to bite into the ground and rotate said shaft, a pair of crank shafts disposed above said plow, means whereby said crank shafts may be rotated by said driving shaft, a frame carried by said crank shafts adapted to alternately move downwardly and rearwardly and forwardly and upwardly thereby conveying potatoes from the plow to the screen, and a counterweight carried at each terminal of one of said crank shafts adapted to regulate the motion of said frame.

4. In a potato digger, the combination with a main supporting frame, of an oscillating screen carried thereby, a plow carried adjacent to said screen adapted to project into the ground, a driving shaft carried by said frame adjacent to said screen, a driving wheel carried at each extremity of said shaft adapted to bite into the ground and rotate said shaft, a gear located on said shaft adjacent to each driving wheel, a plurality of bearing brackets mounted on said frame adjacent to said plow and crank shafts mounted in each bearing pair of said brackets, a train of gears adapted to rotate said crank shafts, a frame carried by said crank shafts adapted to move alternately downwardly and rearwardly and upwardly and forwardly upon rotation of said crank shafts, and a series of downwardly extending resilient fingers carried by said oscillating frame adapted to force the potatoes from the plow into the screen.

5. In a potato digger, the combination with a main supporting frame, of an oscillating screen carried thereby, a plow carried adjacent to said screen adapted to project into the ground, a driving shaft carried by said frame adjacent to said screen, a driving wheel carried at each extremity of said shaft adapted to bite into the ground and rotate said shaft, a gear located on said shaft adjacent to each driving wheel, a plurality of bearing brackets mounted on said frame adjacent to said plow and crank shafts mounted in each bearing pair of said brackets, a train of gears adapted to rotate said crank shafts, a frame carried by said crank shafts adapted to move alternately downwardly and rearwardly and upwardly and forwardly upon rotation of said crank shafts, a crank shaft located on the opposite side of said driving shaft to said oscillated frame, means whereby said crank shaft may be driven by the gears carried by said main driving shaft, and a link connection between said crank shaft and said screen.

6. In a potato digger, the combination with a main supporting frame, of adjustable supporting wheels carried at each extremity thereof, a main driving shaft located adjacent to one terminal of said frame, a driving wheel carried at each end of said shaft and adapted to bite into the ground and rotate said shaft, a gear located at each end of said shaft, adjacent to each driving wheel, a screen pivotally mounted below said driving shaft, a crank shaft mounted on said frame adjacent to one terminal thereof, a link connecting said crank shaft with said screen, and a gear carried at each terminal of said crank shaft adapted to mesh with said driving shaft.

7. In a potato digger, the combination with a main supporting frame, of adjustable supporting wheels carried at each extremity thereof, a main driving shaft located adjacent to one terminal of said frame, a driving wheel carried at each end of said shaft and adapted to bite into the ground and rotate said shaft, a gear located at each end of said shaft adjacent to each driving wheel, a screen pivotally mounted below said driving shaft, a crank shaft mounted on said frame adjacent to one terminal thereof, a link connecting said crank shaft with said screen, a stationary plow located adjacent to one terminal of said frame, a pair of bearing brackets located above said plow, crank shafts mounted in said bearings, an oscillating frame carrying downwardly extending resilient teeth mounted on said crank shafts, and means whereby said crank shafts may rotate by said driving gear.

8. In a potato digger, the combination with a main supporting frame, of adjustable supporting wheels carried at each extremity thereof, a main driving shaft located adjacent to one terminal of said frame, a driving wheel carried at each end of said shaft and adapted to bite into the ground and rotate said shaft, a gear located at each end of said shaft adjacent to each driving wheel, a screen pivotally mounted below said driving shaft, a crank shaft mounted on said frame adjacent to one terminal thereof, a link connecting said crank shaft with said screen, a stationary plow located adjacent to one terminal of said frame, a pair of bearing brackets located above said plow, crank shafts mounted in said bearings, an oscillating frame carrying downwardly extending resilient teeth mounted on said crank shafts, a train of gears meshing with said driving gears adapted to rotate the adjacent crank shaft, means whereby the remaining crank shaft may be driven from last named crank shaft, and counterweights mounted on each end of the crank shaft operated by said driving gears.

9. In a potato digger, the combination with a frame of wheels carried thereby, means whereby said frame may be raised or lowered with respect to said wheels, power transmission wheel carried by said frame adapted to be raised therewith, an oscillatory screen disposed below said frame, means for removing potatoes from the ground, and means for delivering potatoes from last named means to said screen.

In testimony whereof I, JENS OLAF THORSEN, have signed my name to this specification in the presence of two subscribing witnesses, this 11th day of May 1910.

JENS OLAF THORSEN.

Witnesses:
MARCUS MÓLLER,
CHRE GORTENAR.